United States Patent [19]

Jeon et al.

[11] Patent Number: 5,676,824
[45] Date of Patent: Oct. 14, 1997

[54] WATER PURIFIER WITH MEANS FOR INDICATING WHEN FILTER REPLACEMENT IS DUE AND FOR AUTOMATICALLY INITIATING A MEMBRANE WASHING STEP

[75] Inventors: Je-Dal Jeon; Moon-Hyun Cho, both of Suwon; Sun-Yong Choi, Seoul; Keun-Ho Lee; In-Seog Chung, both of Suwon, all of Rep. of Korea

[73] Assignee: Samsung Electronics Co., Ltd., Suwon, Rep. of Korea

[21] Appl. No.: 524,436

[22] Filed: Sep. 6, 1995

[30] Foreign Application Priority Data

| Sep. 30, 1994 | [KR] | Rep. of Korea | 94-25721 |
| Nov. 14, 1994 | [KR] | Rep. of Korea | 94-30235 |
| Nov. 14, 1994 | [KR] | Rep. of Korea | 94-30245 |
| Nov. 14, 1994 | [KR] | Rep. of Korea | 94-30248 |
| Nov. 14, 1994 | [KR] | Rep. of Korea | 94-30253 |
| Nov. 14, 1994 | [KR] | Rep. of Korea | 94-30254 |

[51] Int. Cl.$^6$ .......................... B01D 61/72; B01D 65/02
[52] U.S. Cl. .................. 210/85; 55/274; 210/87; 210/138; 210/321.69
[58] Field of Search .................. 210/85, 87, 90, 210/96.1, 130, 138, 139, 143, 257.2, 259, 335, 321.69, 433.1, 636, 94; 55/274; 340/611

[56] References Cited

U.S. PATENT DOCUMENTS

| 3,856,676 | 12/1974 | Grimme et al. | 210/321.69 |
| 4,623,451 | 11/1986 | Oliver | 210/87 |
| 4,918,426 | 4/1990 | Butts et al. | 340/611 |
| 5,089,144 | 2/1992 | Ozkahyaglu et al. | 210/87 |
| 5,096,574 | 3/1992 | Birdsong et al. | 210/90 |
| 5,282,972 | 2/1994 | Hanna et al. | 210/257.2 |
| 5,427,682 | 6/1995 | Vogel et al. | 210/321.69 |
| 5,494,573 | 2/1996 | Schoenmeyr et al. | 210/257.2 |
| 5,499,197 | 3/1996 | Fou | 210/143 |

*Primary Examiner*—Joseph W. Drodge
*Attorney, Agent, or Firm*—Burns, Doane, Swecker & Mathis, L.L.P.

[57] ABSTRACT

A water purifier includes a replaceable pre-processing filter, a washable membrane, and a replaceable post-processing filter through which potable water is sequentially conducted. A controller determines a total use time of the filters and membrane and compares the total use time with a reference time for replacement of the filters and washing of the membrane. When the total use time for the filters has reached the reference time, visual and audio indicators are activated. When the total use time for the membrane has reached the reference time, a valve is actuated which permits potable water to flow across and clean the membrane and then be discharged to waste.

9 Claims, 10 Drawing Sheets

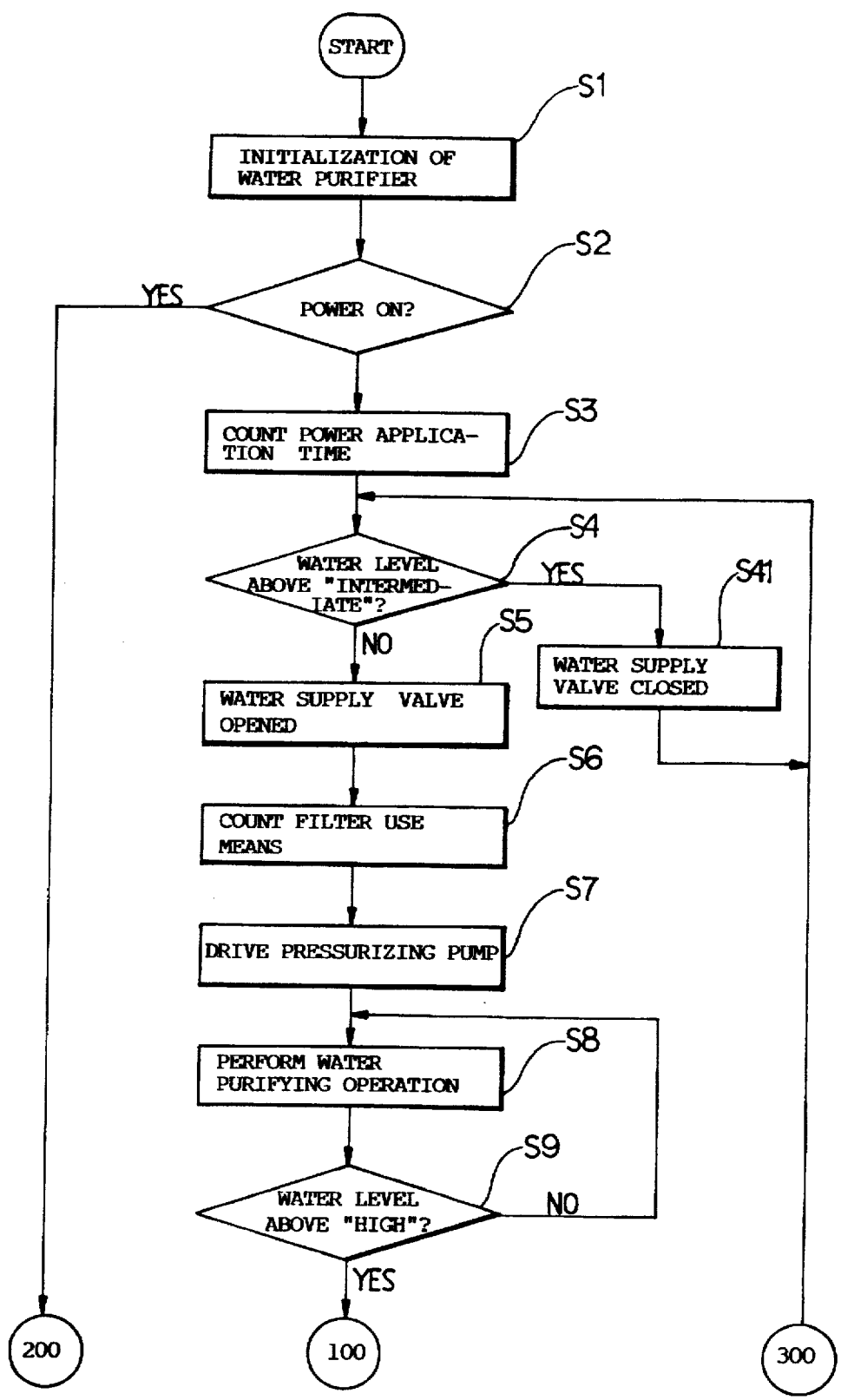

5,676,824

WATER PURIFIER WITH MEANS FOR INDICATING WHEN FILTER REPLACEMENT IS DUE AND FOR AUTOMATICALLY INITIATING A MEMBRANE WASHING STEP

BACKGROUND

1. Field of the Invention

The present invention relates to a water purifier for removing harmful pollutant materials contained in potable water such as faucet water or the like to thereby purify the water, and more particularly to a reporting device of filter exchange time for a water purifier capable of counting a filter used time to thereby report a user a filter exchange time.

2. Description of Prior Art

Generally, a water purifier serves to remove harmful cancer-causing materials contained in the potable water such as the faucet water and the like to thereby supply purified water, and according the purifying method thereof, the water purifier can be classified into a naturally-filtering type, a directly-connected filtering type, an ion exchange resin type and an inverted osmotic pressure type.

Among these types, the water purifier by the inverted osmotic pressure method serves to apply pressure to the potable water to force it through a membrane which is an artificial osmotic membrane (an inverted osmotic filter), thereby performing the water purifying.

The water purifier by the inverted osmotic pressure method is widely used in the most sophisticated scientific industries for cleaning hyper precision electronic parts or in medical fields in that it can separately remove heavy metals, bacteria, cancer-causing materials and the like, and, at the same time, it can supply only the purified water containing clean water and dissolved oxygen.

Referring to FIG. 1, a conventional water purifier by the inverted osmotic pressure method is illustrated, where the potable water such as faucet water and the like supplied into a supply tube 3 through an adapter 2 connected to a faucet 1 passes through a pre- processing filter 5 arranged at a rear side of a body 4 and various harmful organic chemical materials such as chlorine substances and the like are removed.

The potable water which has passed the pre-processing filter 5 is controlled in supply quantity thereof by a supply valve (not shown) and, at the same time, is raised in pressure thereof to a predetermined level according to a drive of a pressurizing pump to thereby be infused into a membrane section 6.

At this time, the potable water infused into the membrane section 6 permeate different types of membranes (not shown) disposed in the membrane section 6 whereby various heavy metals, cancer-causing materials, bacteria and the like contained in the potable water are removed, and the potable water that has passed the membrane section 6 is in turn passed through a post-processing filter 7 whereby odor caused by poisonous gas and the like is removed.

The water now having a good taste by passing through the post-processing filter 7 and by having the odor resulting from the poisonous gas and the like removed is supplied into a storage tank 9 through a supply hole 8.

When the storage tank 9 is supplied with the pure water, it is discriminated whether the pure water quantity supplied to the storage tank 9 is at the high level (the maximum quantity) or at the low level (the minimum quantity).

In case the water quantity supplied to the storage tank 9 is at the high level, the water is inhibited from entering the storage tank 9, and in case the water quantity supplied to the storage tank 9 is at the low level, the water is allowed to be supplied to the storage tank 9, so that the storage tank 9 can be always maintained at a predetermined level with the water.

The water stored in the storage tank 9 can be dispersed through a disposal outlet by operation of a lever.

However, there is a problem in the conventional water purifier in that no separate device is arranged thereon for determining the life of the respective filters (pre-processing filter, membrane and post-processing filter), so that a filter exchange time can be indicated to a user by a sales shop or an agent thereof, thereby causing many inconveniences to the user.

Furthermore, there is another problem in that, because the filter exchange time cannot be accurately known, in case the filter is overused, it can be overused and clogged with foreign objects, causing a sanitary problem, and in case the filter is frequently changed, filters are uneconomically wasted.

SUMMARY OF THE INVENTION

Accordingly, the present invention has been disclosed to solve the aforementioned problems, and it is an object of the present invention to provide a reporting device of filter exchange time for a water purifier by which the filter used time can be counted to allow the user to be advised of the filter exchange time, thereby providing convenience and a sanitary water purifier to the user.

It is another object of the present invention to provide a reporting device of filter exchange time for a water purifier by which an effective life management can be possible by way of a simple operation of a key even in the case of a forced exchange of the filter.

It is still another object of the present invention to provide a reporting device of filter exchange time for a water purifier by which membranes are periodically cleaned to thereby prolong the life of the water purifier.

In accordance with the objects of the present invention, there is provided a reporting device of filter exchange time for a water purifier capable of performing the water purifying operation by passing the potable water through a pre-processing filter, a membrane and a post-processing filter, the reporting device comprising:

key input means for inputting a key signal to establish used time of a pre-processing filter, a membrane and a post-processing filter;

control means for receiving the key signal generated from the key input means to discriminate a forced exchange time of the filters and at the same time to count the used time of the pre-processing filter, membrane and the post-processing filter, so that the filter exchange time can be determined;

memory means for memorizing erstwhile filter used time so as to calculate a total used time of the filters according to the used time counted at the control means;

indicating means for indicating the filter exchange time according to the total used time of the filters memorized in the memory means and at the same time for indicating the forced exchange time of the filters according to the key signal input from the key input means;

alarm generating means for generating an alarm to report the filter exchange time according to the total used time of the filters memorized in the memory means; and solenoid valve driving means for controllably drive a solenoid valve to clean the membrane according to control of the control means.

BRIEF DESCRIPTION OF THE DRAWINGS

Other objects and aspects of the invention will become apparent from the following description of embodiments with reference to the accompanying drawings in which:

FIGS. 7A to 7D are flow charts for illustrating control operation procedures of the filter exchange time for the water purifier according to the present invention.

DETAILED DESCRIPTION OF THE PREFERRED EMBODIMENT OF THE INVENTION

The embodiment of the present invention will now be described in detail with reference to the accompanying drawings.

Figure 1:
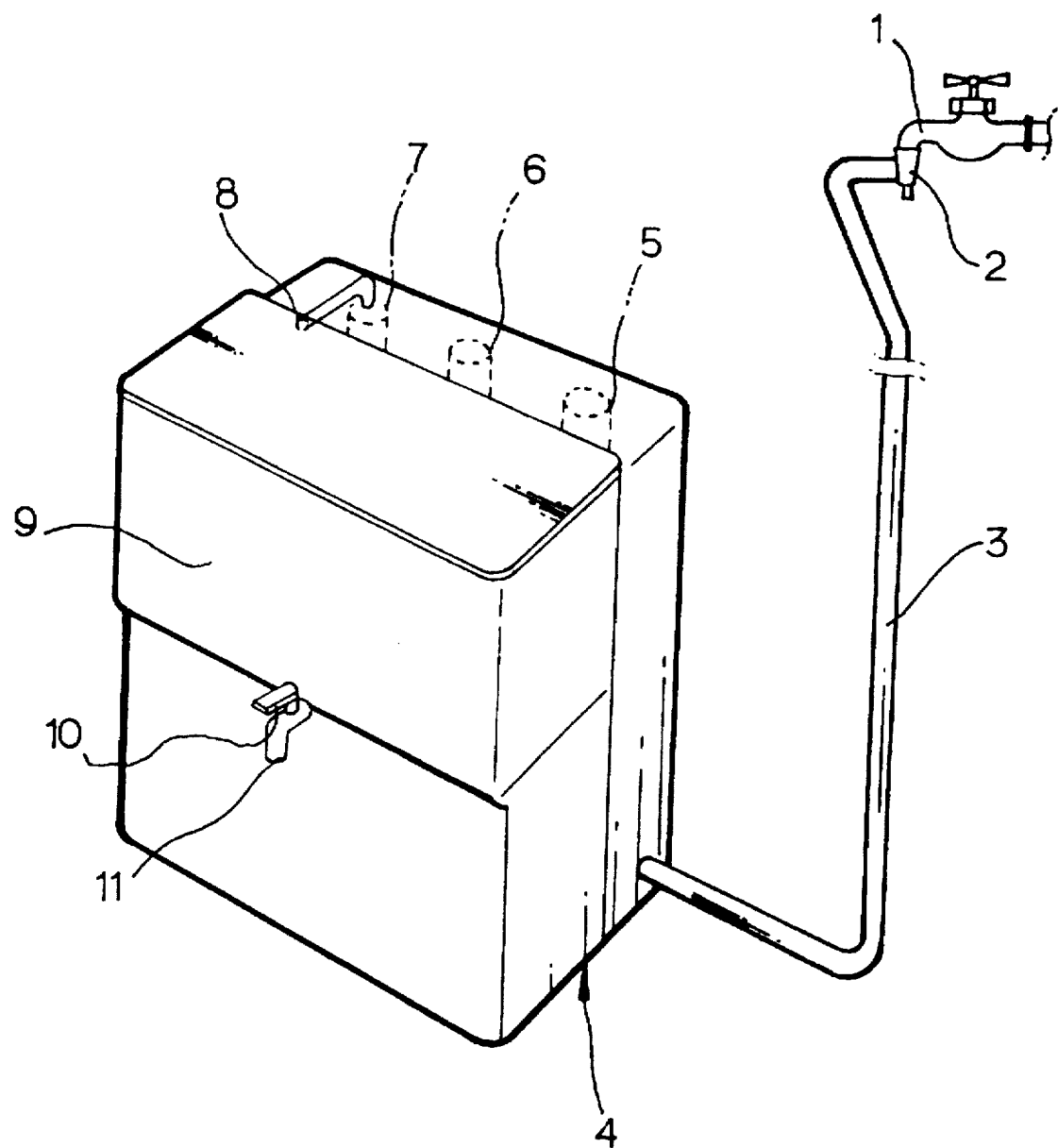
FIG. 1 is an overall perspective view for illustrating a conventional water purifier.
Figure 2:
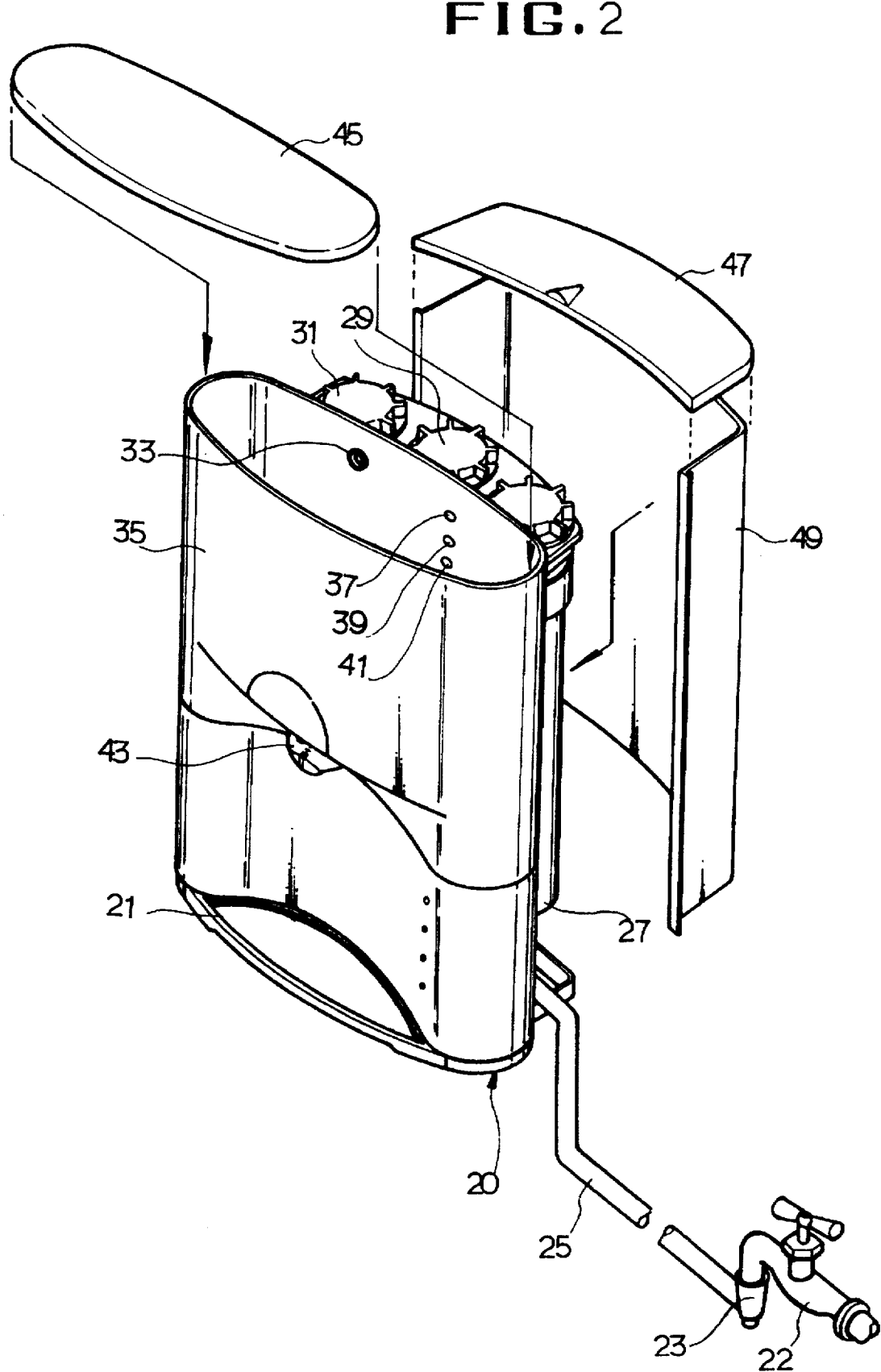
FIG. 2 is an exploded perspective view for illustrating a water purifier according to an embodiment of the present invention.

As shown in FIG. 2, reference numeral 20 is a body of a water purifier and the body 20 is formed at a front side thereof with a receiving unit 21 for receiving cups or the like during a water dispensing step The body 20 is connected at a rear side thereof with one end of a water supply tube 25 for connecting to a connecting unit 23 coupled with a faucet 22.

The water supply tube 25 is connected at the other end thereof with a pre-processing filter 27 for removing organic chemical materials containing various harmful substances such as chlorine and the like when the potable water is supplied from the faucet through the connecting unit 23.

Furthermore, the pre-processing filter 27 is connected to a membrane section 29 containing a plurality of different types of membranes (not shown) in order to eliminate various heavy metals, cancer-causing materials, germs, bacteria and the like.

The membrane section 29 is connected to a post-processing filter 31 by a hose 29a for removing odor such as harmful gas contained in the potable water which has passed the membrane section 29.

The body 20 is releasably provided at an upper side thereof with a storage tank 35 formed at one side thereof with a water supply hole 33 for receiving and storing the potable water which has passed the post-processing filter 31.

The storage tank 35 is provided at an inner rear side thereof with a high water level sensor 37 and a low water level sensor 39 for detecting the quantity of the potable water stored in the storage tank 35.

The storage tank 35 is coupled at a front side thereof with a disposal lever 43, so that the potable water in the storage tank 35 can be dispensed through a disposal outlet (not shown) and the body 20 is coupled at an upper side thereof with upper covers 45 and 47, and the body 20 is coupled at a rear surface thereof with a rear cover 49.

Reference number 41 is a ground terminal.

Figure 3:
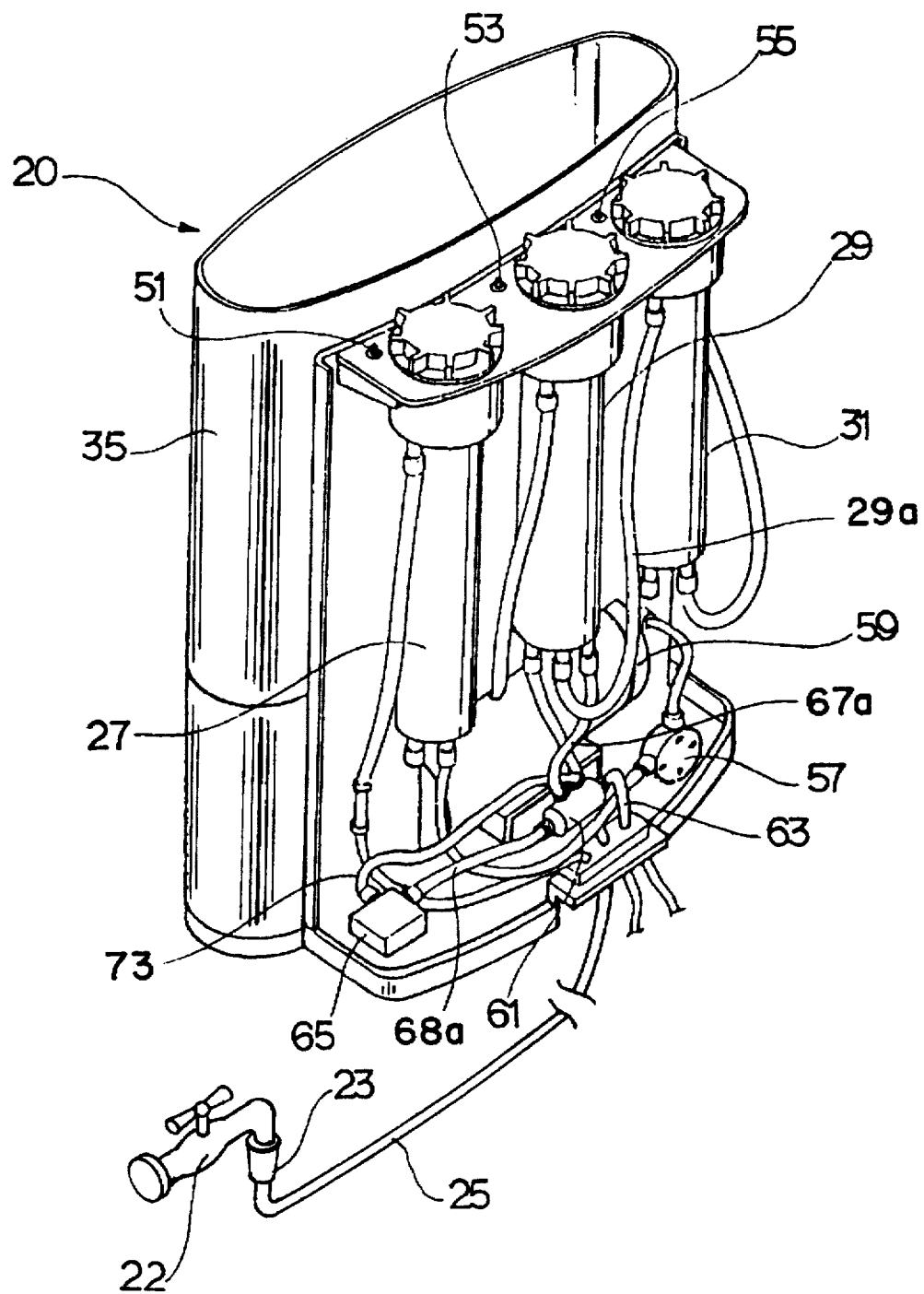
FIG. 3 is a rear elevation of the water purifier according to the embodiment of the present invention.

As illustrated in FIG. 3, the pre-processing filter 27, the membrane section 29 and the post-processing filter 31 are provided at respective upper surfaces thereof with reset switches 51, 53 and 55 for resetting the in-use time of the pre-processing filter 27, membrane section 29 and the post-processing filter 31 and at the same time for inputting forced exchanged times of the pre-processing filter 27, membrane section 29 and the post-processsing filter 31.

Furthermore, the post-processing filter 31 is provided at a lower end thereof with a water supply valve 57 for being opened and closed according to water levels in the storage tank 35.

The water supply valve 57 is equipped at a rear end thereof with a pressurizing pump 59 in order to increase to a predetermined level the pressure of the potable water infused into the membrane section 29, so that the potable water infused into the membrane section 29 through the pre-processing filter 27 can be purified by the inverted osmotic pressure in the membrane section 29 with a predetermined pressure.

Furthermore, the membrane section 29 is provided at a lower end thereof with a discharge means 61 for selectively discharging concentrated water received from the filter 27 and which has not penetrated the different types of membranes in the membrane section 29 and also for discharging cleaning water which has removed foreign objects smeared in the membranes to thereby clean the membrane section 29.

The discharge means 61 is provided at a left side thereof with a solenoid valve 65 for being opened and closed to smoothly discharge through a discharge tube 63 the concentrated water and the cleaning water.

Figure 4:
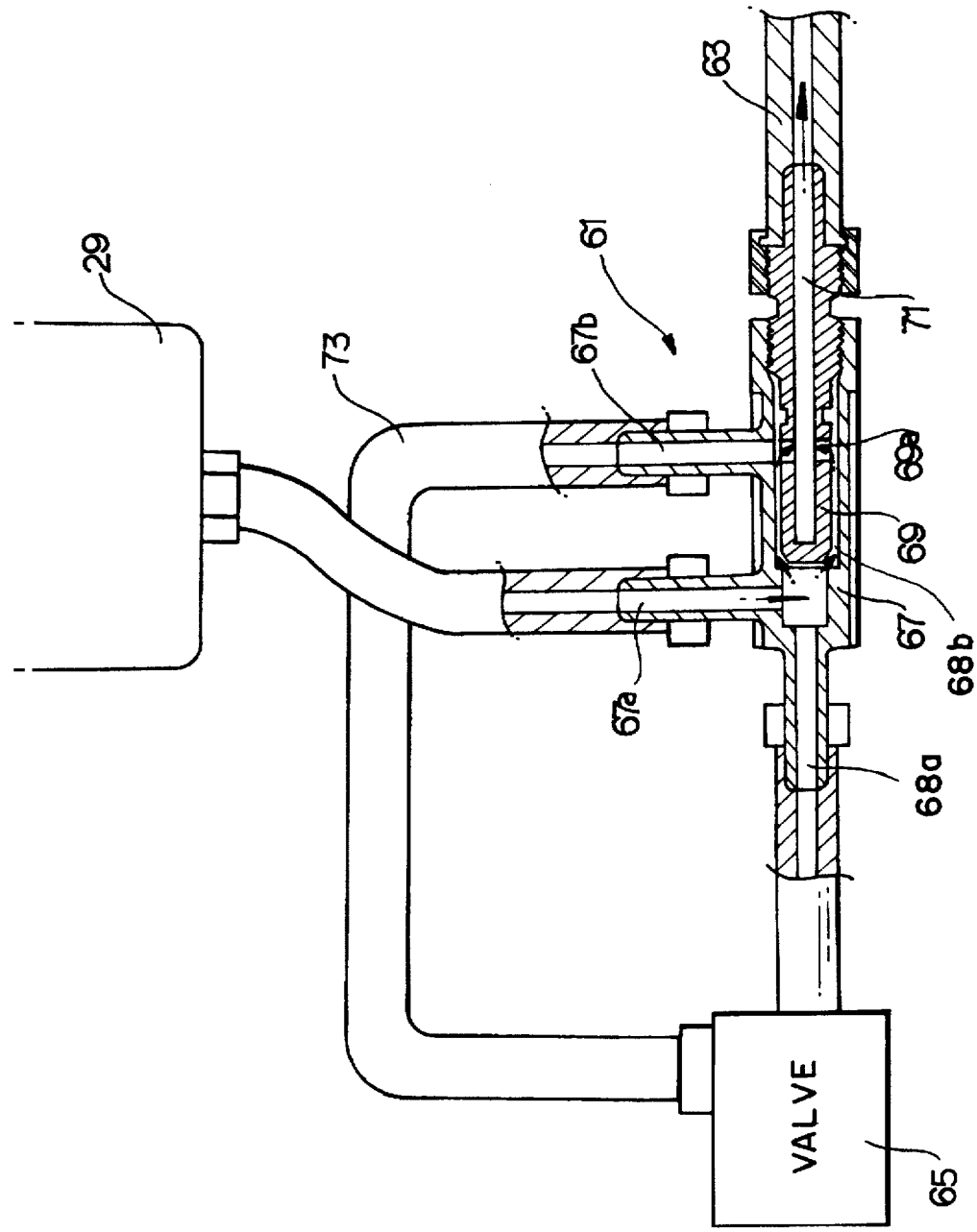
FIG. 4 is a schematical diagram for illustrating a discharged state of concentrated water according to the present invention.
Figure 5:
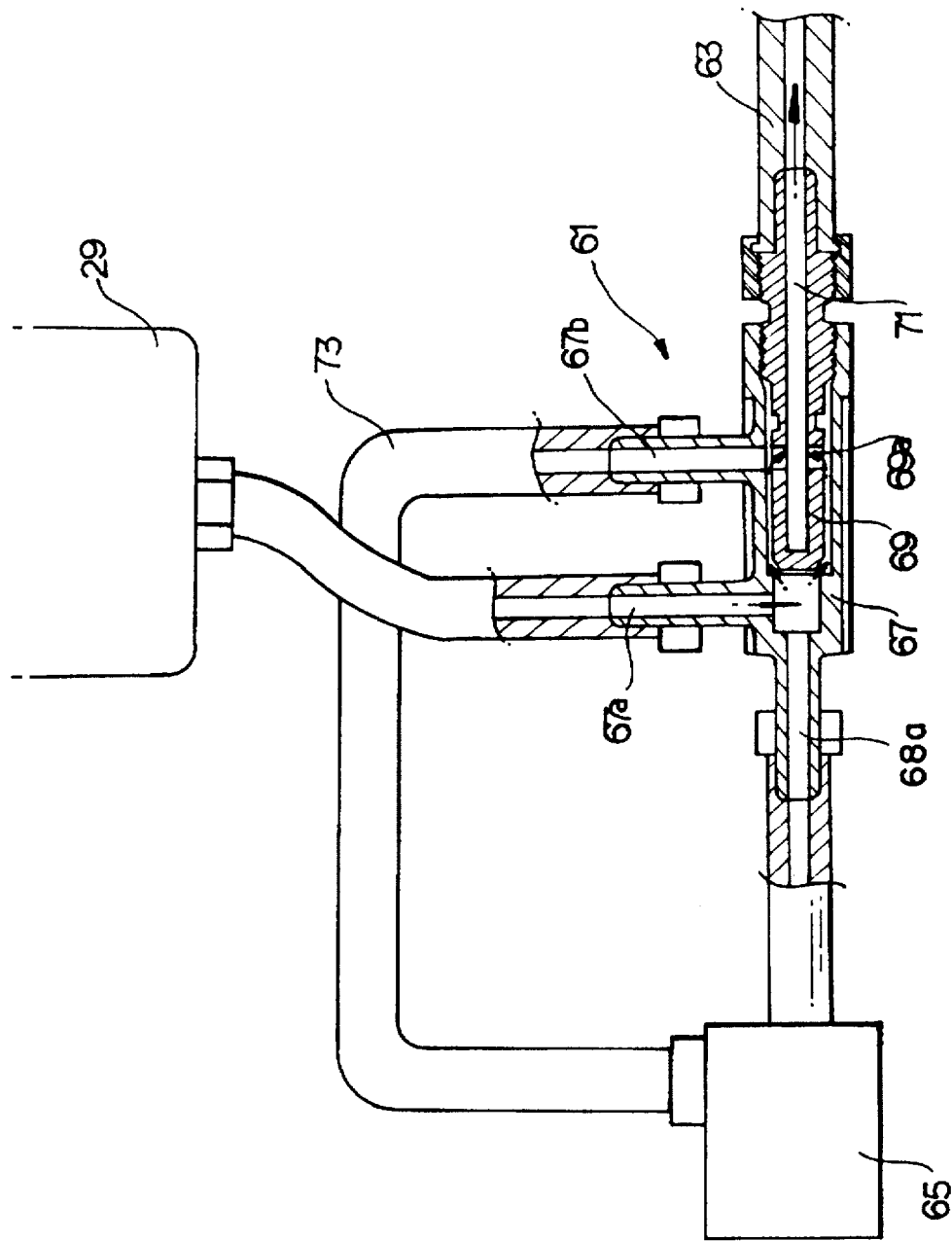
FIG. 5 is a schematical diagram for illustrating a discharged state of cleaning water according to the present invention.

The discharge means 61, as illustrated in FIGS. 4 and 5, includes a housing member 67 having a first inlet 67a and a second inlet 67b each connected to the solenoid valve 65, and a discharge member 69 coupled within the housing member 67 and having a plurality of holes 69a communicating with a discharge passage 71 of the discharge member 69.

The housing member 67 and the discharge member 69 are tightly screwed together in order to prevent leakage of the concentrated water and the cleaning water.

The discharge passage 71 is for discharging the concentrated water and the cleaning water infused through the holes 69a and the discharge member 69 is connected at one end thereof to the discharge tube 63.

The solenoid valve 65 and the second inlet 67b are connected to a connecting tube 73 for conducting cleaning water, occuring only when the solenoid valve 65 is opened, and it is preferable that the holes 69a are formed right under the second inlet 67b in order to expedite smooth infusion of the cleaning water into the discharge passage 71.

A control block diagram of the reporting device of the filter exchange time for the water purifier thus constructed will now be described with reference to FIG. 6.

Figure 6:
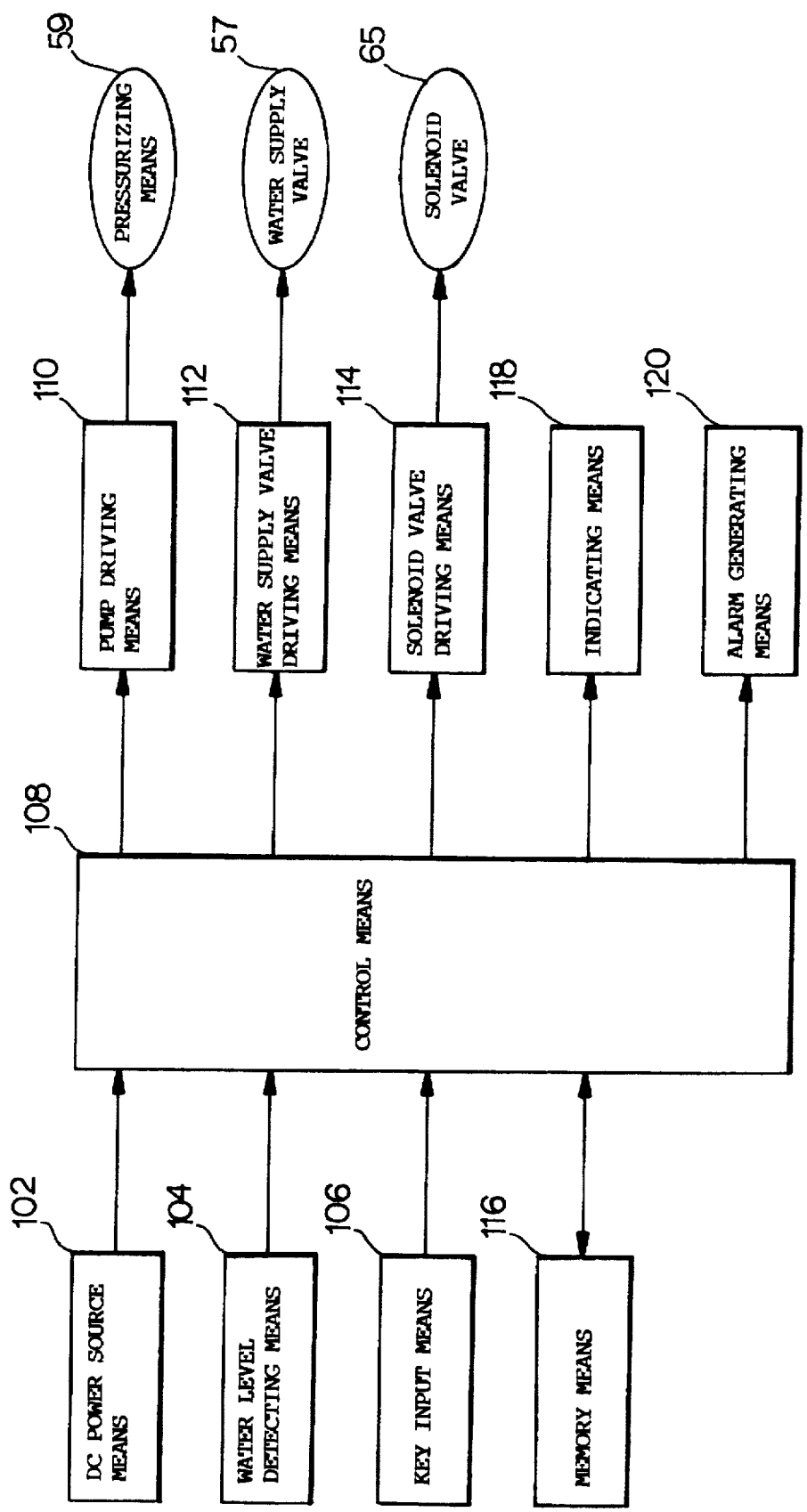
FIG. 6 is a control block diagram of an alarm apparatus of filter exchange time for the water purifier according to the embodiment of the present invention.
Figure 7B:
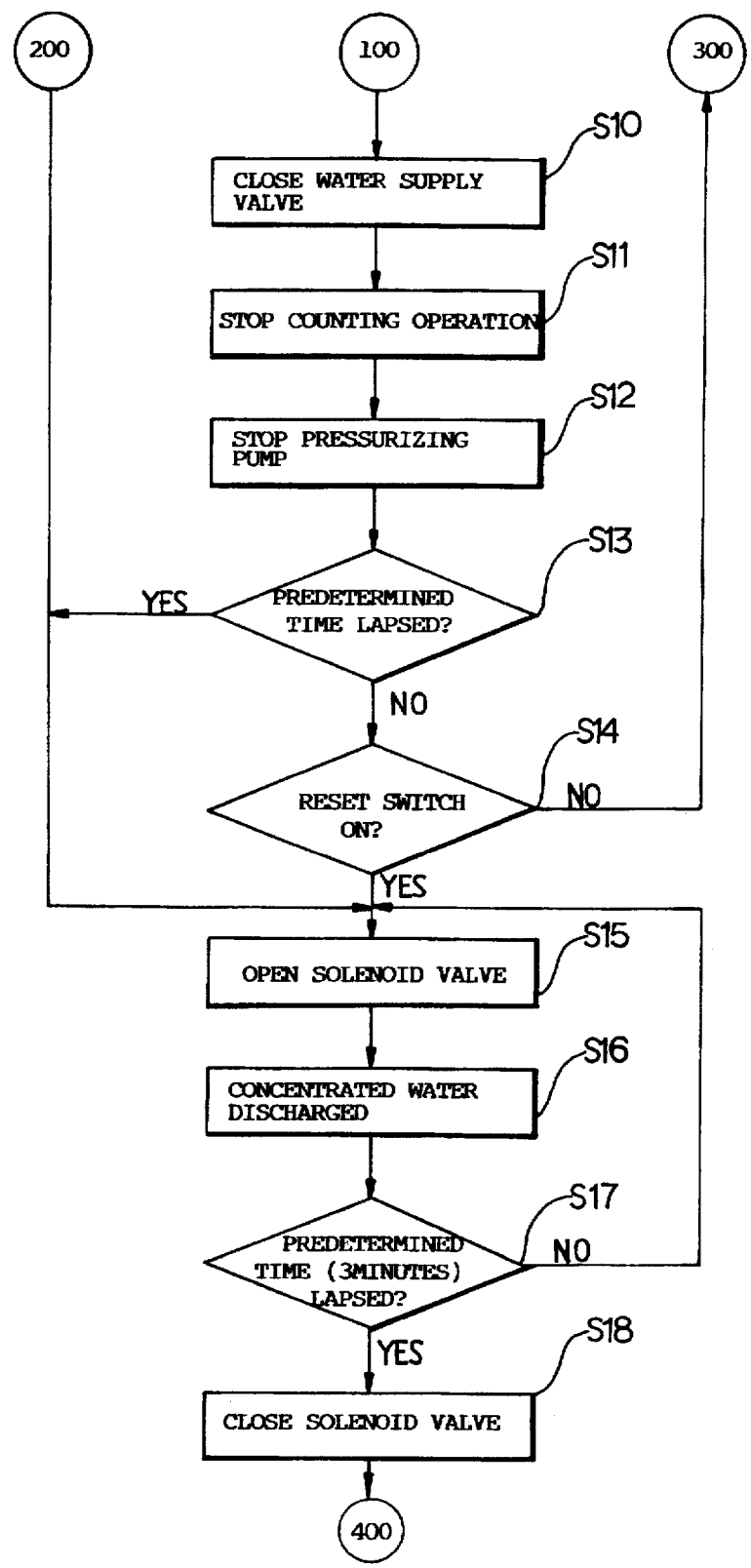
Figure 7C:
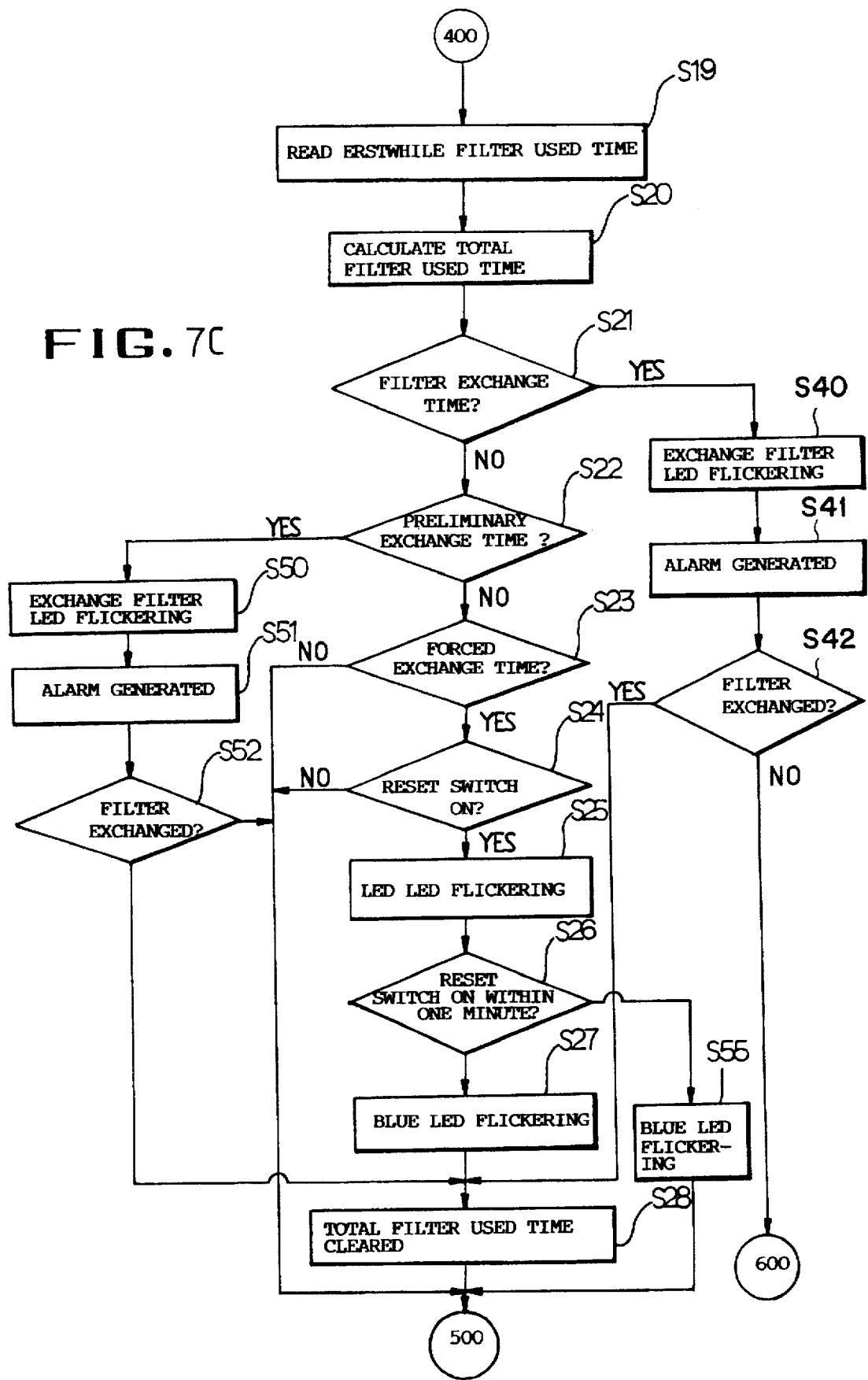
Figure 7D:
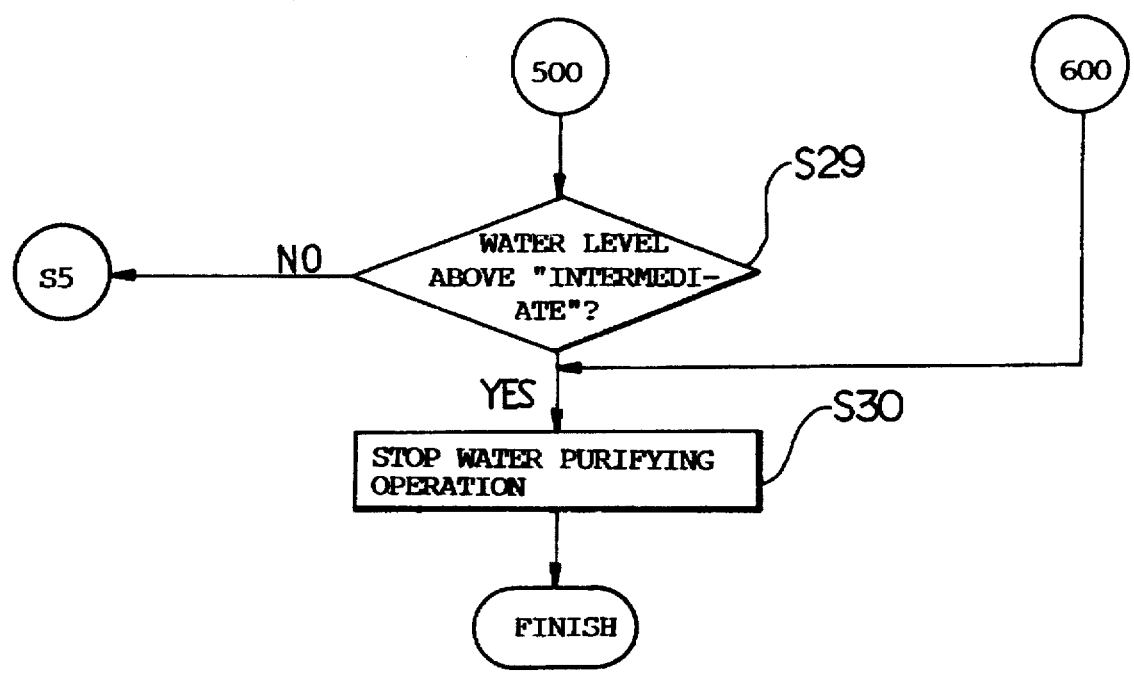

As illustrated in FIG. 6, direct current (DC) power source means 102 serves to receive a power source voltage of commercial alternating current power supplied from an alternating current (AC) power source input terminal (not shown) and to convert the same to a predetermined direct current (DC) voltage necessary for the operation of the water purifier and to output the direct current. The water level detecting means 104 comprise a high water level sensor 37 and a low water level sensor 39 for detecting the water level of the water quantity stored in the storage tank 35.

key input means 106 are reset switches 51,53 and 55 for selecting a key signal so as to clear the used time of the pre-processing filter 37, the membrane section 29 and the post-processing filter 31 and at the same time for inputting the forced exchange time of the pre-processing filter 27, the membrane section 29 and the post-processing filter 31.

Control means 108 is a microcomputer for receiving the DC voltage output from the DC power source means 102 to initialize operation of the water purifier and for receiving a water level detecting signal detected by the water level detecting means 104 to thereby control overall water purifying operations. The control means 108 stores therein a timer for counting the used time of the pre-processing filter 27, the membrane 29 and the post-processing filter 31 and a timer for counting the time when the power source is applied to the water purifier during the initial application of the power source, and the control means 108 serves to pre-store on a ROM (read only memory) table the respective filter exchange time according to the used time of the filters.

Furthermore, pump driving means 110 serves to receive a control signal generated from the control means 108 according to the water level of the storage tank 35 detected by the water level detecting means 104 to controllably drive the pressurizing pump 59 for increasing to a predetermined level the pressure of the potable water infused into the membrane section 29, so that the potable water can be supplied to the storage tank 35.

Water supply valve driving means 112 is adapted to receive the control signal generated from the control means 108 according to the water level of the storage tank 35 detected by the water level detecting means 104 to controllably drive the water supply valve 57, so that supply or interdiction of the potable water supplied through a water supply tube from the faucet 22 can be controlled.

Furthermore, in the drawing, solenoid valve driving means 114 is constructed to receive the control signal output from the control means 108 when the time counted at the control means 108 passes a predetermined period of time (approximately 12 hours) after the key signal from the key input means 106 is input to the control means 108 and controllably drives the solenoid valve 65 so that the cleaning water can be discharged to remove the foreign objects smeared in the different types of membranes in the membrane section 29. That is, when the valve 65 is closed, only some of the water conducted into the membrane section 29 is avoid passing through the membranes by instead traveling to the first inlet 67a, because water flowing from the first inlet 67a to the holes 69a must travel through a restricted narrow passage 68b formed between the discharge member 69 and the housing member 67. This maintains sufficient pressure within the membrane section 29 to force water through the membranes for purification.

On the other hand, when the valve 65 is opened, water in the membrane section 29 is able to by-pass the restricted passage by flowing through the first inlet 67a, a passage 68a, the tube 73, the holes 69a, and the discharge passage 71, thereby relieving the pressure in the membrane section 29, whereupon the water therein will flow along and clean the membranes. That cleaning water is discharged via the first inlet 67a, the passage 68a, the tube 73, the holes 69a, and the discharge passage 71.

Memory means 116 is an EPROM (Erasable and Programmable ROM) where the contents of a memory are recorded or erased electrically, so that the used time of the pre-processing filter 27, the membrane section 29 and the post-processing filter 31 counted at the control means 108 can be memorized according to the opening and closing time ( on and off time ) of the water supply valve 57 during purifying operation of the water purifier.

Display means 118 serves to receive the control signal output from the control means 108 according to a total used time of the filters memorized in the memory means 116, so that an LED (Light Emitting Diode) can be turned on or turned off to thereby indicate that it is time to exchange the exchange time the pre-processing filter 27, the membrane section 29 and the post-processing filter 31.

Furthermore, alarm generating means 120 serves to receive the control signal generated from the control means 108 according to the total used time of the filters stored in the memory means 116 to generate an alarm, so that the exchange time of the pre-processing filter 27, membrane section 29 and the post-processing filter 31 can be audibly reported.

Now, the operation of the reporting device of the filter exchange time for the water purifier thus constructed will be described.

FIGS. 7a through 7d are flow charts for illustrating operational procedures of the reporting device of the filter exchange time for the water purifier, where reference symbol S indicates steps.

First of all, when a power is applied to the water purifier, the direct current power source means 102 serves to convert a power source voltage of the commercial alternating current power source supplied from an alternating current power source input terminal (not shown) to a predetermined direct current voltage necessary for driving the water purifier, to thereby generate the same to respective driving circuits and the control means 108.

Accordingly, at step S1, the direct current voltage output from the direct current power source means 102 is received at the control means 108 to thereby initialize operation of the purifier and at step S2, the control means 108 discriminates whether the direct current voltage applied from the direct current power source means 102 is an initial power source, i.e., a power-on.

As a result of the discrimination at step 82, if it is not the power-on (in case of no), flow advances to step S3 to cause the timer inherently stored in the control means 108 to count the time which lapses after the purifier is applied with the initial power source.

At step S4, the water level detecting means 104 detects the water level of the storage tank 35, i.e.,the water quantity of the storage tank 35, to thereby output a water level data detected therefrom to the control means 108.

Accordingly, the control means 108 discriminates whether the water level of the storage tank 35 detected by the water level detecting means 104 is above "intermediate" level, which is to discriminate whether the water level of the storage tank 35 is above "intermediate" level by being received at the control means 108 of a resistance value detected at the low water level detecting sensor 39 arranged at an inner rear surface of the storage tank 35.

As a result of the discrimination at step S4, if the water level of the storage tank 35 is above the "intermediate" level (in case of yes), flow proceeds to step S41 because it is not necessary to supply the purified water to the storage tank 35, whereupon the control means 108 outputs a control signal to the water supply valve driving means 112 in order to close the water supply valve 57.

Accordingly, the water supply driving means 112 serves to cut off the power source voltage applied to the water supply valve 57 according to the control of the control means 108 to thereby close the water supply valve 57.

When the water supply valve 57 is closed, the control means 108 returns back to step 84 and puts on hold the water purifying operation until the water level of the storage tank 35 drops to the "intermediate" level and executes operations subsequent to step S4 repeatedly.

Meanwhile, as a result of the discrimination at step S4, if the water level of the storage tank 35 is not above the "intermediate" level (in case of no), the control means 108 serves to output a control signal at step S5 to the water supply driving means 112 for opening the water supply valve 57, so that water purifying operation can be executed for supplying the purified water into the storage tank 57.

Accordingly, the water supply driving means 112 serves to supply a power source voltage to the water supply valve 57 according to the control of the control means 108 to thereby open the water supply valve 57.

At this time, the filter used time is cleared according to the opening of the water supply valve 57 at step 6 and the timer inherently stored in the control means 108 starts to count the current used time of the filters.

When the water valve 57 is opened, the potable water such as the faucet water starts to be inflowed into the water supply tube 25 through the connecting unit 23 from the faucet 22 and the control means 108 outputs to the pump driving means 110 at step S7 a control signal for driving the pressurizing pump 59, so that the potable water for being supplied into the water supply tube 25 and infused into the membrane section 29 can be raised in pressure to a predetermined level.

Accordingly, the pump driving means 110 serves to receive the control signal output from the control means 108 to thereby supply the power source voltage applied to the pressurizing pump 59, so that the pressurizing pump 59 can be driven.

When the pressurizing pump 59 is driven, the potable water supplied into the water supply tube 25 from the faucet 22 according to the opening of the water supply valve 57 is removed of the various harmful organic chemical materials such as the chlorine and the like at step S8 and the potable water which has passed the pre-processing filter 27 is infused into the membrane section 29 through the water supply valve 57 with the valve 65 being closed.

The potable water which has passed through the membranes passes in turn through the post-processing filter 31 to thereby be removed of odors such as from poisonous gas and the like, and then, the water purifying operation where the purified water is supplied into the storage tank 35 through the water supply hole 33 is executed.

Meanwhile, the concentrated water infused into the membrane section 29 which has not passed through the membranes is discharged from the membrane section 29 into the housing member 67 through the first inlet 67a.

The concentrated water is unable to flow into the connecting tube 73 since the solenoid valve 65 is closed, and instead, travels into the discharge passage 71 in the discharge member 69 through the restricted passage 68b and holes 69a to thereafter be discharged outside through the discharge tube 63, as illustrated by the arrows in FIG. 4.

At this time, a ratio between the purified water infused into the post-processing filter 31 from the membrane section 29 and the concentrated water which has not passed through the membranes, but rather has been discharged outside through the discharge tube 63 is approximately 1:2.

Subsequently, at step S9, the water level detecting means 104 detects the water level of the storage tank 35, i.e., the purified water quantity supplied to the storage tank 35 through the water supply hole 33 during the water purifying operation at step S8 and a water level data detected therefrom is generated to the control means 108.

Accordingly, the control means 108 discriminates whether the water level of the storage tank 35 detected by the water level detecting means 104 is above "high" by receiving at the control means 108 a resistance value detected by the high water level detecting sensor 37 arranged at the inner rear surface of the storage tank 35.

As a result of the discrimination at step S9, if the water level of the storage tank 35 is not "high" (in case of no), flow returns to step S8 and performs the water purifying operation, and repeatedly executes the operations subsequent to step S8 because the storage tank 35 should be supplied with the purified water.

Meanwhile, as a result of the discrimination at step S9, if the water level of the storage tank 35 is above "high" (in case of yes), flow advances to step S10,where the control means 108 outputs to the water supply valve driving means 112 a control signal for closing the water supply valve 57 because the supply of the purified water into the storage tank 35 should be stopped.

Accordingly, the water supply valve driving means 112 serves to cut off the power source voltage applied to the water supply valve 57 according to the control of the control means 108 to thereby close the water supply valve 57.

At this time, the timer inherently stored in the control means 108 stops at step 11 a counting operation of the present filter used time according to the closing of the water supply valve 57 and the flow advances to step S12, where the control means 108 outputs a control signal to the pump driving means 110 in order to stop the pressurizing pump 59.

Accordingly, the pump driving means 110 serves to cut off the power source voltage applied to the pressurizing pump 59 according to the control of the control means 108 to thereby stop the pressurizing pump 59.

When the water supply valve 57 is closed and the pressurizing pump 59 is stopped, the faucet 22 is stopped from supplying the potable water to the water supply tube 25 to thereby cut off the supply of the purified water to the storage tank 35, so that water purifying operation is stopped.

Subsequently, a discrimination is made at step S13 as to whether a power application time counted at the timer stored at the control means 108 has passed a predetermined time (approximately 12 hours) and if the power application time has not passed the predetermined time (in case of no), flow proceeds to step S14, where the control means 108 discriminates whether reset switches 51, 53 and 55 of the key input means 106 for resetting the used times of the pre-processing filter 27 and the membrane 29 and the post-processing filter 31 are rendered active.

This is to discriminate if any of the reset switches 51,53 and 55 attached to respective filters has been rendered active during exchanges of the pre-processing filter 27, the membrane section 29 and the post-processing filter 31.

As the result of the discrimination at step S14, if the reset switches 51, 53 and 55 are not activated (in case of no), flow returns to step S4 to continuously detect the water level in the storage tank 35, and, at the same time, to repeatedly perform the operations subsequent to step S4.

If the reset switches 51,53 and 55 are discriminated as activated (in case of yes), flow advances to step S15, where the control means 108 outputs a control signal to the solenoid valve driving means 114 in order to initiate a cleaning operation to clean the foreign objects smeared on the membranes.

Accordingly, the solenoid valve driving means 114 serves to suppy a power source voltage to the solenoid valve 65 according to the control of the control means 108, thereby opening the solenoid valve 65.

When the solenoid valve 65 is opened, the potable water infused into the membrane section 29 through the pre-processing filter 27 passes along the different types of membranes (not shown) disposed in the membrane section 29 to thereby remove various heavy metals, cancer-causing materials, bacteria or the like smeared on the different types of the membranes, and then, the cleaning water is flowed through the first inlet 67a of the discharge member 61.

The cleaning water infused into the housing member 67 flows into the housing member 67 through the passage 68a, the solenoid valve 65, the connecting tube 73 and the second inlet 67b as per the arrows illustrated in FIG. 5, and then, flows into the discharge passage 71 through the plurality of holes 69a. The cleaning water is then discharged outside through the discharge tube 63.

At this time, the purifying operation is not executed because the potable water infused into the membrane section 29 from the pre-processing filter 27 cannot pass through the membranes.

Successively, a discrimination is made at step S17 as to whether cleaning water has been discharged according to the opening of the solenoid valve 65 and whether a predetermined time (approximately 3 minutes) has passed. If the predetermined time has not passed (in case of no), the flow returns to step S15 and performs repeatedly the operations subsequent to step S15.

As a result of the discrimination at step S17, if the predetermined time has passed (in case of yes), it is discriminated that the foreign objects such as various heavy metals, cancer-causing materials, bateria and the the like are removed from the membranes, and the control means 108 outputs at step S18 a control signal to the solenoid valve driving means 114 in order to close the solenoid valve 65.

Accordingly, the solenoid valve driving means 114 cuts off the power source voltage applied to the solenoid valve 65 according to the control of the control means 108 to thereby close the solenoid valve 65.

When the solenoid valve 65 is closed, the potable water which has passed the pre-processing filter 27 and has been infused into the membrane section 29 now passes through the different types of the membranes, where various heavy metals, cancer-causing materials and the bacteria and the like are removed from the water.

The potable water is now re-infused into the post-processing filter 31, and concentrated water which has not passed the different types of membranes is infused into the housing member 67 through the first inlet 67a and is infused into the discharge passage 71 through the passage 68b and the holes 69a to thereafter be discharged outside through the discharge tube 63 as illustrated in by arrows in FIG. 4.

Of course, at this time, the ratio between the purified water and the concentrated water discharged via tube 63 is still maintained at approximatedly 1:2.

Successively, the control means 108 at step S19 reads a prior used time of the filter memorized in the memory means 116 and at step S20 the prior used time of the filter stored in the memory means 116 is added by the present used time of the filter counted by the control means 108 to thereby calculate a total filter used time for the current filter and the calculated total filter used time is then memorized at the memory means 116.

Accordingly, at step S21, a discrimination is made as to whether the total filter used time memorized at the memory means 116 has reached the filter exchange time (in other words, the time when the filter life span has been finished) previously established at the control means 108 and if the total filter used time has not reached the filter exchange time (in case of no), flow advances to step S22, where a discrimination is made as to whether the total filter used time memorized at the memory means 116 is 10 days before the filter exchange time; i.e., a discrimination is made as to whether the total filter used time has reached a preliminary exchange time.

As a result of the discrimination at step S22, if the total filter used time has not reached the preliminary exchange time i.e., in case of no, flow proceeds to step S23, where the control means 108 discriminates whether it is a forced filter exchange time.

The forced filter exchange time denotes an optional filter exchange time when a user considers that the filter is damaged or the life of the filter is finished even though it is not the normal time for the filter exchange A forced filter exchange time can occur when the potable water in the storage tank 35 stinks, or foreign objects are generated therein.

As a result of the discrimination at step S23, if it is the time for the forced filter exchange time (in case of yes), flow advances to step S24, where a discrimination is made as to which of the reset switches (51, 53 or 55) for the filter to be exchanged is rendered activated.

The activated state of the reset switch represents a state where the reset switches (51, 53 and 55) corresponding to respective filters have been turned on for a period of 5 minutes.

As a result of the discrimination at step S24, if it is discriminated that the reset switches (51, 53 and 55) are activated (in case of yes), flow proceeds to step S25, where the control means 108 outputs a control signal to the display means 118 for indicating a state in which the user wants to forcibly exchange the filter.

Accordingly, the indicating means 118 lights a red light emitting diode (LED) of a corresponding filter according to the control of the control means 108.

Successively, at step S26, a discrimination is made as to whether the reset switches (51, 53 and 55) have been lighted again within a predetermined period of time (1 minute) after the reset switches ( 51, 53 and 55) are activated at step 824, and if the reset switches (51, 53 and 55) have been activated (in case of yes), flow advances to step S27 because it is discriminated that it is time for the forced filter exchange, where the control means 108 outputs a control signal to the indicating means 118 for indicating a state of the forced filter exchange.

Subsequently, the indicating means 118 lights a blue LED corresponding to the filter to be forcibly exchanged according to the control of the control means 108.

When the filter is forcibly exchanged by the user as described above, the control means 108 at step 828 serves to clear the present filter used time and the total filter used time memorized in the memory means 116 in order to re-count from the beginning the life of the filter forcibly exchanged.

At step S29, the water level detecting means 104 serves to detect the water level of the storage tank 35, i.e., the purified water quantity in the storage tank 35 to thereby output a water level data detected therefrom to the control means 108.

Accordingly, the control means 108 discriminates whether the water level of the storage tank 35 detected by the water level detecting means 104 is above "intermediate", which is to discriminate whether the water level of the storage tank 35 is above "intermediate" by receiving at the control means 108 the resistance value detected by the low water level detecting sensor 39 disposed at the inner rear surface of the storage tank 5.

As a result of the discrimination at step 29, if the water level of the storage tank 35 is not above "intermediate" (in case of no), flow returns to step 85 and executes repeatedly operations subsequent to step S5 so that water purifying operations can be performed for supplying the purified water to the storage tank 35.

Meanwhile, as a result of the discrimination at step S29, if the water level of the storage tank 35 is above "intermediate" (in case of yes), flow advances to step S30, where the control means 108 stops the purifying operation, thereby terminating the whole operations because there is no need to supply the purified water to the storage tank 35.

Furthermore, as a result of the discrimination at step S21, if it is discriminated that the total filter used time is the normal filter exchange time (in case of yes), flow proceeds to step S40, where the control means 108 serves to generate a control signal to the indicating means 118 in order to indicate a filter exchange time.

Accordingly, the indicating means 118 flickers an LED of a corresponding filter which is to be exchanged according to the control of the control means 108.

Then, the control means 108 at step S41 outputs to the alarm generating means 120 a control signal for reporting a filter exchange time.

Accordingly, the alarm generating means 120 serves to generate an alarm in accordance with the control of the control means 108 and flow proceeds to step S42, where the control means 108 discriminates whether the corresponding filter has been exchanged.

As a method of discriminating whether the corresponding filter has been exchanged, the user first exchanges the corresponding filter and discriminates whether the reset switches (51,53 and 55) corresponding to the filters have been activated (state of the switches being pressed for 5 minutes).

As a result of the discrimination at step S43, if it is discriminated that the corresponding filters have been replaced (in case of yes), flow proceeds to step S28, where the control means 108 serves to clear the present filter used time and the total filter used time memorized at the memory means 116 in order to re-count from the beginning the life of the exchanged filter and executes repeated operations subsequent to step S28.

Meanwhile, as a result of the discrimination at step S42, if it is discriminated that the corresponding filter has not been changed (in case of no), flow advances to step S30, where the control means 108 stops the purifying operations and terminates the overall operations.

Furthermore, as a result of the discrimination at step S22, if it is discriminated that the total filter used time is the preliminary exchange time (10 days before the filter exchange time), flow preceeds to step S50, where the control means 108 generates to the indicating means 118 a control signal for indicating that not much time has left to replace the filter.

Accordingly, the indicating means 118 serves to flicker the LED of the corresponding filter which is to be replaced according to the control of the control means 108.

Successively, the control means 108 generates at step S51 to the alarm generating means 120 a control signal for reporting that there remains a limited time for changing the filter.

The alarm generating means 120 serves to generate an alarm according to the control of the control means 108 and flow proceeds to step S52, where the control means 108 discriminates whether the corresponding filter has been replaced.

As a method of discriminating whether or not the filter has been exchanged, the user exchanges the filter and discriminates whether the reset switches (51, 53 and 55) corresponding to the filters have been activated (a state of being turned on for 5 minutes).

As a result of the discrimination at step S52, if it is discriminated that the corresponding filter has been replaced (in case of yes), flow proceeds to step S28, where the control means 108 serves to clear the present filter used time and the total filter used time memorized in the memory means 116 in order to re-count the life of the changed filter from the beginning and performs repeated operations subsequent to step S28.

Meanwhile, as a result of the discrimination at step S52, if it is discriminated that the corresponding filter has not been changed, flow advances to step S29 and executes to perform the repeated operations subsequent to step S29.

Furthermore, as a result of the discrimination at step S2, if it is discriminated that the power is switched on (in case of yes) and if it is discriminated as a result of the discrimination at step S13 that the time counted at the control means 108 has lapsed a predetermined period of time (approximately 12 hours), i.e., in case of yes, flow proceeds to step S15, where an operation of automatically discharging the cleaning water for cleaning the foreign objects smeared in the membrane 29 is executed and the operations subsequent to step S15 are repeatedly performed.

As a result of the discrimination at step S23, if it is discriminated that it is not the time for the filter to be forcibly replaced (in case of no) or if it is discriminated as a result of the discrimination at step S24 that the reset switches (51, 53 and 55) have not yet been activated (in case of no), flow advances to step S29 and executes to perform repeated operations subsequent to step S29.

Still furthermore, as a result of the discrimination at step S26, if the reset switches (51, 53 and 55) have not been activated within the predetermined period of time (in case of no) after the reset switches (51, 53 and 55) had been activated at step S24, it is discriminated that the reset switches (51,53 and 55) have not been pressed to forcibly exchange the filter by the user, but have been pressed by mistake, so that flow proceeds to step S55, where the control means 108 flickers the blue LED of the corresponding filter through the indicating means 118, and keeps counting the life of the corresponding filter. Flow now proceeds to step S29 and repeats to perform the operations subsequent to step S29.

As apparent from the above, the reporting device of the filter exchange time of the water purifier according to the present invention can count a filter used time to thereby report the filter exchange time, thus providing the user convenience and allowing the purifier to become a hygienical gadget.

According to the reporting device of the filter exchange time of the water purifier, an effective life management of the filter can be made possible by way of a simple key operation even during the forced exchange of the filter, the life of the filter can be prolonged by periodically cleaning the membranes.

Having described specific preferred embodiment of the invention with reference to the accompanying drawings, it is to be understood that various changes and modifications may be effected therein by one skilled in the art without departing the scope or spirit of the invention as defined in the appended claims.

What is claimed is:

1. In a water purifier apparatus comprising a replaceable pre-processing filter; a membrane section including a washable membrane; a replaceable post-processing filter; conduits for passing potable water sequentially through said pre-processing filter, said membrane section and said post-processing filter; a discharge passage communicating with the membrane section for discharging water to waste; a valve actuable for causing water in the membrane section to flow, at an increased flowrate, along and wash the membrane and become discharged to waste; and a controller for automatically controlling a flow of potable water through the conduits; said controller including:

determining means for determining a filter total use time in which the filters have been in use, and a membrane total use time in which the membrane has been in use;

comparing means connected to the determining means for comparing the filter total use time and the membrane total use time with respective reference times for replacement of the filters and washing of the membrane;

indicating means connected to the comparing means for providing an indication to a user that the filter total use time has reached its reference time for replacing the filters; and valve-actuating means connected to the comparing means for actuating the valve to cause water to flow across and wash the membrane when the membrane total use time has reached its reference time for washing the membrane;

wherein the discharge passage is arranged to discharge from the membrane section, potable water which has not passed through the membrane.

2. In the water purifier according to claim 1 wherein the controller includes a memory for storing a filter prior use time, and means for summing the stored prior use time with current in-use time to determine the filter total use time.

3. In the water purifier according to claim 1 wherein the controller includes a manual input device enabling a user to signal for a forced filter exchange prior to the filter total use time reaching the respective reference time.

4. In the water purifier according to claim 1 wherein the controller includes a manual input device enabling a user to initiate a forced membrane washing prior to the membrane total use time reaching the respective reference time.

5. In the water purifier according to claim 1 wherein the reference time for washing the membrane is twelve hours.

6. In the water purifier according to claim 1 wherein the indicating means is a visual indicator.

7. In the water purifier according to claim 6 wherein the indicating means is also an audio alarm.

8. In the water purifier according to claim 1 wherein the indicating means is an audio alarm.

9. In a water purifier apparatus comprising a replaceable pre-processing filter; a membrane section including a washable membrane; a replaceable post-processing filter; conduits for passing potable water sequentially through said pre-processing filter, said membrane section and said post-processing filter; a discharge passage communicating with the membrane section for discharging water to waste; a valve actuable for causing water in the membrane section to flow, at an increased flowrate, along and wash the membrane and become discharged to waste; and a controller for automatically controlling a flow of potable water through the conduits; said controller including:

determining means for determining a filter total use time in which the filters have been in use, and a membrane total use time in which the membrane has been in use;

comparing means connected to the determining means for comparing the filter total use time and the membrane total use time with respective reference times for replacement of the filters and washing of the membrane;

indicating means connected to the comparing means for providing an indication to a user that the filter total use time has reached its reference time for replacing the filters; and valve-actuating means connected to the comparing means for actuating the valve to cause water to flow across and wash the membrane when the membrane total use time has reached its reference time for washing the membrane;

wherein the discharge passage is disposed in a housing, the housing including a restricted passage communicating the membrane section with the discharge passage to create pressure in the membrane section; the valve, when in an actuated state, communicating the membrane section with the discharge passage through a conduit which by-passes the restricted passage.

* * * * *